Jan. 31, 1961 W. G. SHEQUEN 2,969,916
SYSTEM FOR CONTROLLING INTERIOR TEMPERATURE
Filed Dec. 9, 1957 2 Sheets-Sheet 1
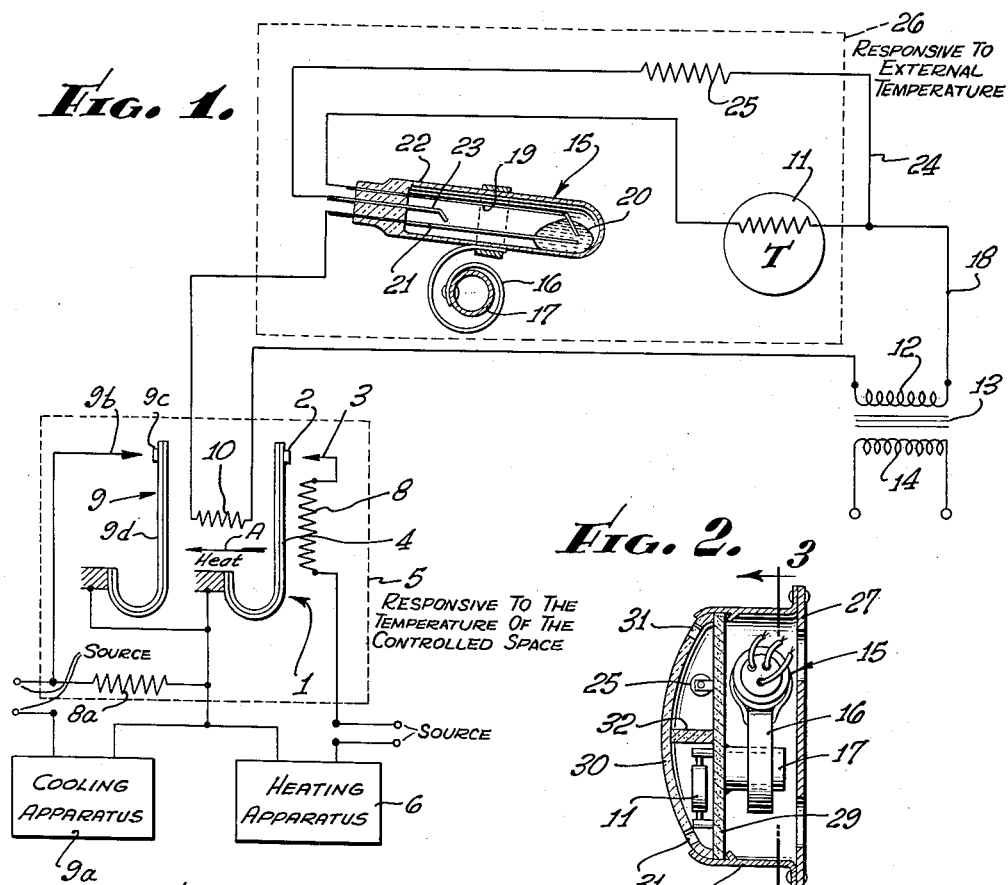
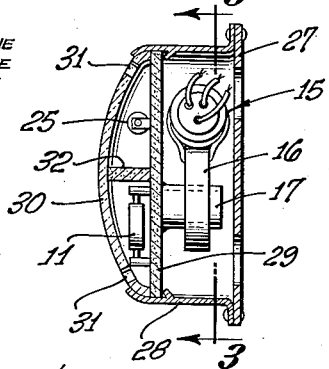
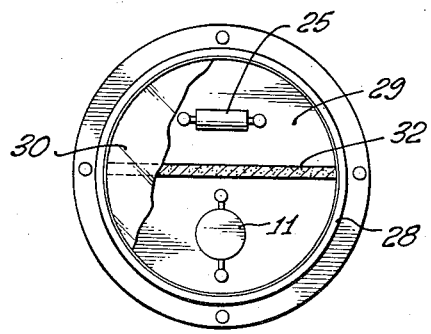
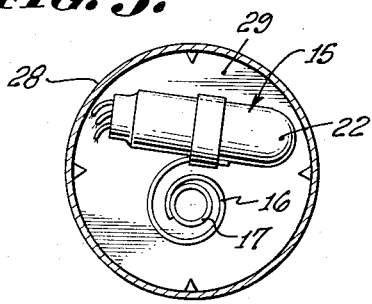
INVENTOR.
WINSTON G. SHEQUEN,
BY
Flam and Flam
ATTORNEYS.

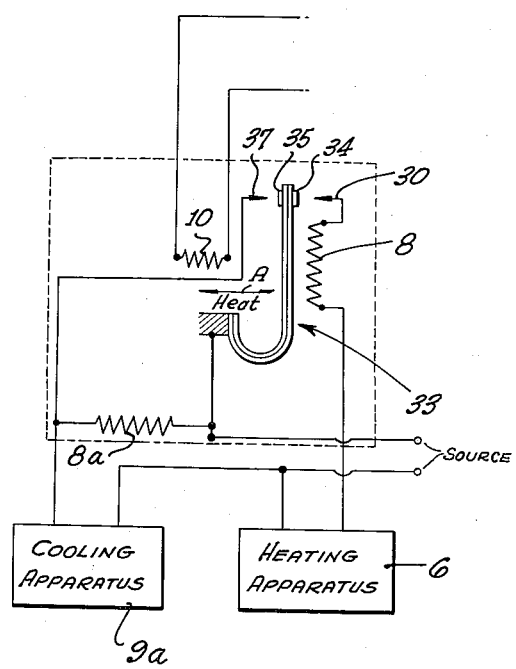

United States Patent Office 2,969,916
Patented Jan. 31, 1961

2,969,916

SYSTEM FOR CONTROLLING INTERIOR TEMPERATURE

Winston G. Shequen, La Crescenta, Calif., assignor to General Controls Co., Glendale, Calif., a corporation of California Filed Dec. 9, 1957, Ser. No. 701,539

2 Claims. (Cl. 236—68)

This invention relates to temperature control of a room or the like.

In an application filed in the name of Justin A. Deubel, on June 13, 1957, under Serial No. 665,449, and assigned to the assignee of this application, there is described a system for controlling the heat supplied to a room or other enclosure. That invention is concerned with the overcoming of undesirable effects of heat anticipation upon the control temperature of a thermostat.

One of the objects of that system is to overcome or reduce the droop or offset occasioned by the use of heat anticipators. Such droop or offset is manifested by a reduction of the temperature at which the thermostat demands heat.

The object is attained by the aid of a thermistor, the resistance of which increases as its temperature decreases, and which is exposed to the external temperatures. This thermistor is in series with a supplemental heater associated with the thermostat. The heat generated by the heater is thus reduced when the external temperature is reduced.

In many instances, the room thermostat is utilized not only for initiating the operation of heating means, but also for causing operation of a cooling system should the room temperature exceed a predetermined limit. This type of temperature control, effective as an all-weather air conditioner, is now known.

The system described in said prior application operates effectively when heat is supplied to the room or other enclosure. However, when the temperature conditioning means is used to extract heat, the thermistor circuit, affecting the heat anticipation, is more a detriment than an advantage.

It is one of the objects of this invention to make it possible to render the thermistor circuit ineffective during those periods when the external temperature is such as to obviate the necessity of adding heat to the interior.

It is another object of this invention to provide simple and effective apparatus for effecting these results.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is a schematic wiring diagram of a system for heating or cooling a space, and incorporating the invention;

Fig. 2 is a sectional view, mainly diagrammatic, of apparatus utilized in connection with the system shown in Fig. 1;

Fig. 3 is a sectional view taken along a plane corresponding to line 3—3 of Fig. 2;

Fig. 4 is an elevation as viewed from the left of Fig. 2, the cover member for the apparatus being broken away; and Fig. 5 is a fragmentary diagrammatic view of an alternative form of the control system.

In Fig. 1, a thermostat 1 is arranged to open or close a circuit controller including contact members 2 and 3. The contact member 2 is shown as mounted upon a bimetal member 4. This member 4 is arranged to move to the right upon a decrease in temperature, and to move toward the left upon an increase in temperature, respectively to close and open the contact members 2 and 3.

The contact member 2 is appropriately carried by the bimetal member 4 adjacent the free end of the bimetal member. The contact member 3 is normally stationary.

This device 1 is intended to cooperate with apparatus for providing heat, such as a furnace, and diagrammatically indicated by the block 6.

A second thermostat 9, of the same general nature as thermostat 1, controls apparatus 9a for providing a cooling function. This control is effected by aid of stationary contact point 9b and contact point 9c mounted on the bimetal 9d. An increase in heat serves to move the upper ends of both thermostats, toward the left, as indicated by arrow A. Accordingly, when the temperature at these thermostats increases, the contact member 2 is moved away from member 3 and contact member 9c is moved toward the member 9b. Upon a sufficient rise in temperature, the cooling function is initiated.

The thermostat devices 1 and 9 are both located in a housing 5 which is placed in an enclosure, the temperature of which is to be controlled. This enclosure may be a room, auditorium, theater, or the like.

Upon a sufficient decrease in temperature, the circuit controller 2—3 operated by the bimetal member 4 initiates the heating function. Thus, the system 6 may serve to heat the room when the contact points 2 and 3 are in engagement. When a cooling function is demanded by thermostat 9, the apparatus for producing the cooling is operated.

It is common to provide, in connection with thermostats of this character, a heat anticipator heater 8 which is also in series with the contact members 2 and 3. Accordingly the heater 8 which is enclosed in the housing 5, serves to heat the bimetal member 4 just as soon as the contact members 2 and 3 are closed. The closing of the contacts 2 and 3 causes the thermostat 1 to deenergize the control circuit before the temperature of the enclosure or room reaches the temperature at which the thermostat is set. Such heat anticipating systems being now well-known, further description thereof is considered unnecessary.

The control circuit for the heating function may be supplied from any appropriate source of electrical energy. The source may be arranged to supply an electromotive force of twenty-four volts, which is standard for control circuits of this character.

It is also common (although not essential) to provide a "cold anticipator" heater 8a to cooperate with the thermostat 9. When provided, this anticipator serves to deenergize the apparatus 9a earlier than if the anticipator 8a were omitted.

Let us assume that the temperature prevalent exterior of the enclosure wherein the thermostat 1 is located, is substantially below the temperature within the enclosure. Under such circumstances, it has been found to add to the comfort of the occupants to delay the opening of the thermostat contact members 2 and 3 so as to continue the heating beyond that which would occur under normal circumstances. Thus, an additional heating means, such as the heater 10, located within the housing 5 is caused to affect the temperature of the thermostat 1. This heating means may be such that when the exterior temperature is low, the heating current through the heating means 10 is reduced. On the other hand, as the external temperature rises, the heating current through the additional heating means 10 is increased and the thermostat 1 opens the control circuit earlier than otherwise. The combined maximum effect of heating means 8 and 10 is carefully chosen to cause the contact members 2 and 3 to open when there exists the desired maximum differential between the temperature at the thermostat 1 and in the enclosure or space being heated. As the external temperature drops, the heating effect of the heater 10 is reduced so as to retard opening of the contact members 2 and 3 and thereby to retard the shutting off of the source of heat.

To effect this result, use is made of a thermistor 11 placed in series with the heating means 10 when the system is to supply heat. The thermistor has a resistance which increases upon a decrease in temperature. It is energized by the aid of a secondary winding 12 of a stepdown transformer 13. The primary winding 14 may be connected to any appropriate source of electrical energy.

The thermistor 11 is so arranged that its resistance varies substantially with the temperature to which it is exposed. Accordingly, it is placed exterior of the enclosure. As the temperature is reduced, the resistance of the thermistor 11 increases, thereby reducing the heating effect of the heating means 10. As the exterior temperature increases, the thermistor resistance decreases, with the attendant increase in the heat produced by the heating means 10.

The circuit for the thermistor 11 includes a circuit controller 15, which may be a mercury switch and arranged to complete the circuit through the additional heater 10. The circuit controller 15 responds to the external temperature, as by being mounted on a bimetal member 16 shown as spiral in form and attached at its inner end to a tubular support 17 (see also Figs. 2 and 3). This bimetal member 16 is exposed to the external temperature.

In the position of Fig. 1, the external temperature is assumed to be low. The circuit controller 15 is accordingly such as to form a complete circuit traced as follows: from the right-hand lead of coil 12, connection 18, thermistor 11, contact member 19, the body of mercury 20, contact member 21, through the heater 10, back to the left-hand terminal of the secondary winding 12.

The mercury switch 15 includes a sealed envelope 22 which encloses the contact members 19 and 21, as well as the body of mercury 20.

When the temperature increases to a sufficient value, the spiral bimetal member 16 moves the switch 15 in a counterclockwise direction so as to open the circuit between members 19 and 21. Under such circumstances, contact is established between contact member 21 and a third contact member 23. The circuit through the thermistor 11 is interrupted. However, the circuit for the heater 10 is maintained, and may be traced as follows: winding 12, connections 18 and 24, a fixed resistance 25, contact members 23 and 21, heater 10, back to winding 12.

Accordingly, when the temperature is sufficiently high, the heating effect of heater 10 is made substantially constant and independent of external temperature variations. This changeover in the position of the circuit controller 15 can be effected at any desired point, such as at or beyond 70° F. The system is then conditioned for extracting heat, by virtue of the operation of thermostat 9.

The thermistor 11, resistance 25, the switch 15 and its bimetal support 17 may be conveniently supported in a common enclosure 26. One form of construction that this enclosure may take is illustrated in Figs. 2, 3 and 4. Thus there is an apertured base 27 mounting a cylindrical body member 28. The apertures in base 27 permit the bimetal 16 to be influenced by the temperature of the surrounding exterior atmosphere. A heat insulation wall 29 is provided at the left-hand portion of the enclosure from which extends the supporting post 17. It is upon this supporting post that the switch 15 is mounted.

On the left-hand side of the barrier there is provided a weather-proof cover member 30 appropriately attached to the cylindrical body member 28. This cover member 30 may be provided with one or more apertures 31 to subject the interior of the enclosure 26 to the external temperature. A transverse heat insulation barrier 32 extends from the left-hand side of the heat insulation wall 29. Above the wall 32 may be supported the fixed resistance 25 and below it the thermistor 11.

By the aid of the heat insulation barriers 29 and 32, none of the heat developed by the thermistor 11 and the resistance 25 can appreciably affect any of the other elements or the bimetal member 16.

In the form shown in Fig. 5, a single thermostat 33 carries two contact members 34, 35 that cooperate respectively with the stationary contacts 36, 37. This thermostat 33 thus accomplishes the function of both thermostats 1 and 9 in the system of Fig. 1. The mode of operation of both systems is substantially identical.

The inventor claims:

1. In a system for controlling the temperature of a space, said system having a thermostat structure, and circuits controlled by the thermostat structure for adding to or extracting heat from the space, the combination therewith of: a heat anticipator for the thermostat structure; additional heating means for the thermostat structure; means responsive to the external temperature for decreasing the energization of the additional heating means upon a decrease in external temperature, and for increasing the energization of the additional heating means upon an increase in external temperature; said external temperature responsive means including a temperature sensitive resistance variable over a temperature variation which includes the range of external temperatures in which heating of the space is required, and said temperature variation extending beyond the top of said external temperatures in which heating of the space is required; and means responsive to a rise in external temperature beyond the top of said range, for energizing said additional heating means at a substantially constant rate, including a circuit having a fixed resistance therein, a circuit controller for connecting said circuit to the additional heating means, and means sensitive to external temperature for operating said circuit controller at the top of said range.

2. The combination as set forth in claim 1, in which the circuit controller has two operative positions, corresponding alternatively to energization of the additional heating means in accordance with external temperature, or to energization of the additional heating means at a constant rate.

References Cited in the file of this patent

UNITED STATES PATENTS

| | | |
|---|---|---|
| 2,024,385 | Persons | Dec. 17, 1935 |
| 2,171,803 | Parks et al. | Sept. 5, 1939 |
| 2,183,874 | Shivers | Dec. 19, 1959 |
| 2,188,877 | Kriechbaum | Jan. 30, 1940 |
| 2,240,390 | Chappell | Apr. 29, 1941 |
| 2,288,843 | Roland | July 7, 1942 |
| 2,732,132 | Hulett | Jan. 24, 1956 |